2,807,768

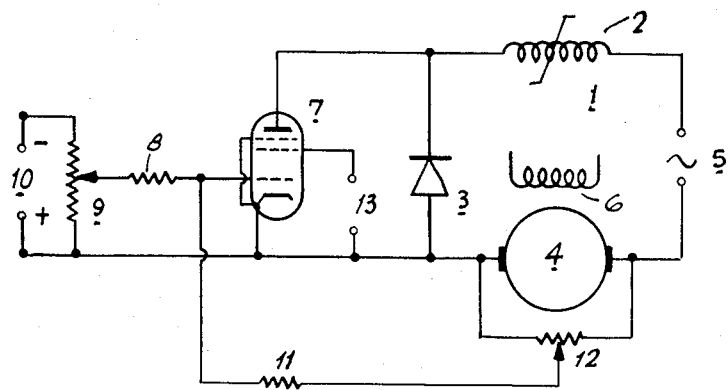

ELECTRIC MOTOR CONTROL SYSTEMS

James Sherlock, Sale, and Noel Edward Dines, Manchester, England, assignors to Metropolitan-Vickers Electrical Company Limited, London, England, a British company Application September 11, 1956, Serial No. 609,296

Claims priority, application Great Britain September 12, 1955

5 Claims. (Cl. 318—331)

This invention relates to speed control systems for electric motors, and particularly to such control systems of the kind in which a speed-responsive voltage derived in accordance with the speed of the motor is caused to act in a control circuit in opposition to a reference voltage, and the difference between said voltages controls an amplifier whereby the speed of the motor will be regulated to a value, which may be constant or adjustable, determined by the magnitude of said reference voltage.

Various speed control systems of the kind referred to are known in which the amplifier comprises grid-controlled rectifiers of the full-wave or half-wave thyratron type. Other speed control systems of this type are known wherein full-wave magnetic amplifiers are employed.

In the previous arrangements just above referred to, it is necessary to derive the speed responsive voltage from a tachometer generator coupled with the armature of the motor, or to employ the armature voltage of the motor; in the latter case the control circuit in which said armature voltage acts must be arranged so as to receive also a voltage proportional to the armature current in order that the resultant voltage derived from the armature shall be compensated for the resistance drop in the motor. In general it is found that for accuracies of speed regulation greater than plus or minus 3% a tachometer generator is necessary. When employing the armature voltage of the motor for the control circuit it is necessary to provide a filter circuit so that the commutator ripple in the armature shall not be applied to the amplifier.

In the case of amplifiers of the thyratron type, means must also be employed for limiting the thyratron current in order to avoid damage due to over-loading.

According to the present invention, an electric speed control system of the kind referred to comprises a magnetic amplifier or saturable core reactance device of the half-wave type wherein the output winding of said device is connected with the armature of the motor in series with a half-wave rectifier for supplying half-wave rectified current to said armature, and there is connected in parallel with said rectifier, hereinafter termed the load rectifier, a current path including current control means operative to control the value of current in said path and to rectify the current in said path so as to pass current in the output winding and the armature in the opposite direction to that permitted by the rectifier, said current control means being responsive to the difference between a voltage derived from the armature of the motor and a reference voltage. Conveniently, the current control and rectifier operation is provided by a thermionic valve, preferably of the pentode type.

In the control circuit according to the invention, the half-wave saturable core reactance device arranged with a load rectifier and in parallel with the latter a circuit combination operating as above described is of a per se known type. In this arrangement the load rectifier operates so that current will flow to the load during alternate half cycles of alternating voltage in the output circuit, and the saturation effects in the core are controlled by the circuit combination comprising the current controller and rectifier referred to. Thus, in the absence of such circuit combination, the direct current component of the half-wave rectified load current will saturate the core so that said current has a maximum value, whereas were the load rectifier short-circuited the output current would be an alternating current, namely the magnetisation current of the core, since the reactance device is then in effect a simple choke coil. The circuit combination referred to may provide a maximum resistance in the circuit in parallel with the load rectifier such that said magnetisation current is permitted to flow. If then said resistance is increased in value a part only of the magnetisation of the core will be provided by the alternating current so that a greater effective current will flow in the load rectifier, that is to say, in each half-cycle of load current the latter will rise to a value determined by the mean voltage in the previous half-cycle.

In the control system according to the invention, the control of the magnetisation current, whereby the output of the saturable core device is determined, is effected by the circuit combination, preferably a pentode valve as stated, during the alternate half-cycles of the supply voltage when the load rectifier is non-conducting. During these half-cycles no appreciable current flows in the armature circuit and the voltage appearing at the brushes of the motor is the back E. M. F. generated as a result of the excitation provided on the motor and the speed of rotation of the latter. Assuming a separate excited winding providing constant ampere turns on the motor, then said voltage is directly proportional to the motor speed and independent of the load on the motor. Furthermore, since the control is obtained during the non-conducting half-cycles of the load rectifier, the induced voltage is substantially constant during these half-cycles so that filtering circuits are unnecessary, that is to say the voltage peaks consequent on the operation of the magnetic saturable core device on alternating current, occur only on the non-conducting half-cycles of the pentode or other circuit controller and therefore do not affect the operation of the amplifier.

The arrangement has a further advantage in that the discontinuous nature of the armature current due to the half-wave rectification results in the armature inductance of the motor and the residual conductance of the saturable core reactance and load rectifier acting so as to impart to the system a substantially constant current characteristic for any given value of the voltage applied to the current controlling combination, that is to say of the control grid voltage in the case of a thermionic valve. By this means the system inherently limits the maximum armature current which may flow.

By the employment of the particular type of magnetic amplifier hereinbefore specified, the arrangement provides a rapid response of the amplifier to changes in the control voltage so that the arrangement has a high degree of inherent stability. In many cases the system is inherently stable without the provision of special stabilising means such as feed-back circuits or the like, such as is well known in the art, also such provision may be included where desired or necessary.

The rapid response of the magnetic amplifier of the type referred to results from the fact that since the control of the output current is obtained by control of the magnetisation current only and can therefore be caused to reach the stable steady-state amplitude in each cycle of the supply voltage an approximately constant delay in response of load current to change in the input signal is obtained, which delay is less than one cycle of the supply frequency.

Reference will now be made by way of example to the accompanying drawing, the single figure of which is an electrical circuit diagram illustrating one embodiment of the invention. The system comprises a saturable core reactance device 1 having thereon a winding 2 which is included in series with a half-wave load rectifier 3 and the armature 4 of a motor for energisation from a constant voltage alternating current supply source at 5. The motor is provided with a field winding 6 connected with a direct current source (not shown) of constant voltage. The load rectifier is shunted by the anode-cathode path of a thermionic valve 7 of the pentode type, the anode and cathode being connected so as to conduct current in the opposite direction to the load rectifier. The control grid of the pentode is connected by means of a current limiting resistor 8 (or voltage mixing resistor) with the variable tapping point of a potentiometer 9, the ends of which are connected with a constant voltage source of direct current at 10 and one end of which is connected with the cathode of the pentode. The control grid is also connected by means of a current limiting resistor 11 with the variable tapping point of a second potentiometer 12 which is connected across the brushes of the motor.

The arrangement is such that the two potentiometers tend to apply control voltages of opposite polarity to the grid of the pentode, and the resistors 8 and 11 provide that the actual potential of the grid will be dependent upon the difference between the voltages derived from the two potentiometers. The voltage derived from the potentiometer 8 is negative so as to tend to reduce the anode current of the pentode whilst the voltage derived from the second potentiometer 12 is positive and therefore tends to increase the anode current of the pentode.

It will be clear therefore that the anode current of the valve will depend upon the difference between the voltages derived from the two potentiometers. Maximum change in anode current is possible for a change of a few volts in the grid potential.

In operation, during each non-conducting half-cycles of the load rectifier 3, the pentode will conduct current, the magnitude of which is small in comparison with the load current flowing in the previous half-cycle. During this non-conducting half-cycle of the rectifier the voltage across the brushes will be dependent entirely upon the motor field current and the motor speed as hereinbefore described, that is to say said voltage will not obtain any component due to resistance drop. The armature current during the conducting half-cycles of the load rectifier is determined by the pentode current during the other half cycles, and the arrangement is such that when the voltage derived from the potentiometer 12 is greater than that derived from the potentiometer 8 the anode current is increased thereby to reduce the load current which will flow in the conducting half-cycles of the load rectifier. Conversely, if the voltage derived from the potentiometer 12 is less than that derived from the potentiometer 8 the pentode current is reduced with consequent reduction of the armature current during the conducting half-cycles of the load rectifier. The arrangement therefore operates so as to regulate the armature current in opposite sense to variations of speed of motor from the value determined by the first potentiometer and thereby maintain the motor speed at said value irrespectively of load or voltage variations.

Since the pentode valve conducts only during alternate half-cycles the voltage applied to the screen grid by a source at 13 may be either a direct or alternating voltage.

In place of a pentode the circuit controller may comprise a triode, tetrode, or a transistor.

What we claim is:

1. A speed control system for a direct current motor comprising: a magnetic amplifier of the half-wave type including a saturable core reactance and a half-wave rectifier, the output winding of said reactance being adapted to be connected with the armature of the motor in series with said half-wave rectifier for supplying half-wave rectified current to said armature, and a current path connected in parallel with said rectifier and including current control means operative to control the value of current in said path and to rectify the current in said path so as to pass current in the output winding and the armature in the opposite direction to that permitted by the rectifier, said current control means being responsive to the difference between a voltage derived from the armature of the motor and a reference voltage.

2. A speed control system for a direct current motor as defined in claim 1, in which the current control means comprises a thermionic valve.

3. A speed control system for a direct current motor as defined in claim 1, in which the current control means comprises a thermionic valve of the pentode type.

4. A speed control system for a direct current motor comprising: a magnetic amplifier of the half-wave type having a saturable core reactance and a half-wave rectifier connected in series; circuit connections for electrically connecting said serially connected reactance and rectifier across the armature of a direct current motor for supplying rectified half-wave current thereto; a thermionic valve having anode, grid and cathode elements, said anode and cathode elements being respectively connected across said rectifier to pass rectified current through said output winding in the opposite direction from that permitted by said rectifier; circuit connections for impressing a first direct current voltage on said grid; and circuit connections for impressing a second direct current voltage on said grid responsive to the voltage across said armature and oppositely polarized from said first direct current voltage whereby the current passed by said valve is responsive to the difference between said first and second direct current voltages.

5. A speed control system for a direct current motor comprising: a magnetic amplifier of the half-wave type having a saturable core reactance and a half-wave rectifier connected in series; circuit connections for electrically connecting said serially connected reactance and rectifier across the armature of a direct current motor for supplying rectified half-wave current thereto; a thermionic valve having anode, grid and cathode elements, said anode and cathode elements being respectively connected across said rectifier to pass rectified current through said output winding in the opposite direction from that permitted by said rectifiers; a potentiometer adapted to be connected in circuit between a fixed source of direct current and said grid from impressing a first selectively variable direct current voltage on said grid; and another potentiometer adapted to be connected in circuit between said armature and said grid for impressing a second direct current voltage on said grid responsive to the voltage across said armature and oppositely polarized from said first direct current voltage whereby the current passed by said valve is responsive to the difference between said first and second direct current voltages.

No references cited.